United States Patent
Mann et al.

(10) Patent No.: US 8,989,216 B2
(45) Date of Patent: Mar. 24, 2015

(54) DIAMETER VERSIONING DICTIONARY

(75) Inventors: Robert Mann, Carp (CA); Mike Vihtari, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 67 days.

(21) Appl. No.: 13/436,321

(22) Filed: Mar. 30, 2012

(65) Prior Publication Data

US 2013/0259065 A1 Oct. 3, 2013

(51) Int. Cl.
*H04L 29/06* (2006.01)

(52) U.S. Cl.
CPC .................. *H04L 63/0892* (2013.01)
USPC ................ 370/465; 370/466; 370/467

(58) Field of Classification Search
CPC ............ H04L 29/06163; H04L 1/0001; H04L 29/06068; H04L 29/06095
USPC ......................... 370/465, 466, 467
See application file for complete search history.

(56) References Cited

U.S. PATENT DOCUMENTS

| 2010/0311392 A1* | 12/2010 | Stenfelt et al. ............... 455/411 |
| 2012/0158994 A1* | 6/2012 | McNamee et al. ............ 709/238 |
| 2013/0064093 A1* | 3/2013 | Ridel et al. .................... 370/236 |

FOREIGN PATENT DOCUMENTS

EP 1916797 A1 * 6/2009

OTHER PUBLICATIONS

3rd Generation Partnership Project; Technical Specification Group Core Network and Terminals; Policy and Charging Control (PCC) over Gx reference point (Release 10) 3GPP TS 29.212 V10.5.0 (Dec. 2011). www.3gpp.org.
Calhoun, Loughney, Guttman, Zorn, Arkko, Diameter Base Protocol, Network Working Group.

* cited by examiner

*Primary Examiner* — Un C Cho
*Assistant Examiner* — Natali N Pascual Peguero
(74) *Attorney, Agent, or Firm* — Kramer Amado P.C.

(57) ABSTRACT

Embodiments of the invention provide a flexible Diameter command dictionary for 3rd Generation Partnership Project (3GPP) network nodes wherein context-specific definitions are defined to apply to different versions and releases of 3GPP standards.

16 Claims, 2 Drawing Sheets

| | | 200 | |
|---|---|---|---|
| \multicolumn{4}{|c|}{Diameter Versioning Dictionary} |
| AVP | \multicolumn{3}{|c|}{Definition(s)} |
| AVP 1 | Default Definition A1 | \multicolumn{2}{|c|}{Context-specific Definitions} |
| | | Context 1 | Definition A1-1 |
| AVP 2 | Default Definition A2 | | |
| AVP 3 | Default Definition A3 | \multicolumn{2}{|c|}{Context-specific Definitions} |
| | | Context 1 | Definition A3-1 |
| | | Context 2 | Definition A3-2 |
| | | Context 4 | Definition A3-4 |
| AVP N | Default Definition AN | \multicolumn{2}{|c|}{Context-specific Definitions} |
| | | Context M | Definition AN-M |
| Commands | \multicolumn{3}{|c|}{Definition(s)} |
| Command 1 | Default Definition C1 | | |
| Command 2 | Default Definition C2 | \multicolumn{2}{|c|}{Context-specific Definitions} |
| | | Context 1 | Definition C2-1 |
| | | Context 3 | Definition C2-3 |
| Command N | Default Definition CN | \multicolumn{2}{|c|}{Context-specific Definitions} |
| | | Context X | Definition CN-X |

FIG. 2

DIAMETER VERSIONING DICTIONARY

FIELD OF THE DISCLOSURE

The disclosures made herein relate generally to the telecommunications industry. The invention discussed herein is in the general classification of a device capable of operation in a mode compatible with different versions of the 3GPP standards and a method for operating according to different versions of the 3GPP standards at the PCRF node.

BACKGROUND

This section introduces aspects that may be helpful in facilitating a better understanding of the invention. Accordingly, the statements of this section are to be read in this light and are not to be understood as admissions about what is in the prior art or what is not in the prior art.

The 3rd Generation Partnership Project (3GPP) attempts to create a uniform third-generation mobile phone system. 3GPP standards are called releases and different functionality is present in the different versions of the releases. The 3GPP standards continue to evolve and the major releases of the standards can be differentiated using supported features. However, there also may be differences between minor versions of the 3GPP standards that render them incompatible with each other. In addition, different vendors might implement major versions at different stages or at different time resulting in different implementations of a particular major version which can lead to compatibility issues when interacting with network nodes from different vendors.

Diameter is a computer networking protocol for AAA (Authentication, Authorization and Accounting) defined in Internet Engineering Task Force (IETF) RFC 3588, which is hereby incorporated by reference. 3GPP Network nodes communicate using Diameter commands and to maintain extensibility, typically use a Diameter command dictionary to provide the format of commands and Attribute Value Pairs (AVPs). Definitions of Diameter commands, their associated AVPs, and whether one is optional or mandatory are expected to be static but unfortunately can vary with different versions. Incompatibility issues between different network nodes running different versions of a major release can include not only different definitions of an AVP but also the behavior or implementation of various commands. A traditional Diameter command dictionary implementation is limited in how it can address these issues.

Hence, there is a need for a system for handling Diameter commands with improved flexibility.

SUMMARY OF THE DISCLOSURE

Embodiments of the invention provide a tangible non-transitory storage device readable by a machine, embodying a Diameter protocol command dictionary comprising: a definition for a Diameter protocol command or attribute value pair (AVP) wherein the command or AVP is defined by a default definition unless a specific context applies in which case the command or AVP is defined by a context-specific definition.

In some embodiments the context comprises a specific version of a 3rd Generation Partnership Project (3GPP) standard.

In some embodiments the specific version comprises a proprietary version of the 3GPP standard.

Other embodiments of the invention provide a network node comprising a Diameter protocol command dictionary comprising: a definition for a Diameter protocol command or attribute value pair (AVP) wherein the command or AVP is defined by a default definition unless a specific context applies in which case the command or AVP is defined by a context-specific definition.

BRIEF DESCRIPTION OF THE DRAWINGS

Some embodiments of apparatus and/or methods in accordance with embodiments of the present invention are now described, by way of example only, and with reference to the accompanying drawings in which:

FIG. 2 illustrates a data structure according to an embodiment of the invention.

In the figures, like features are denoted by like reference characters.

DETAILED DESCRIPTION

Figure 1:
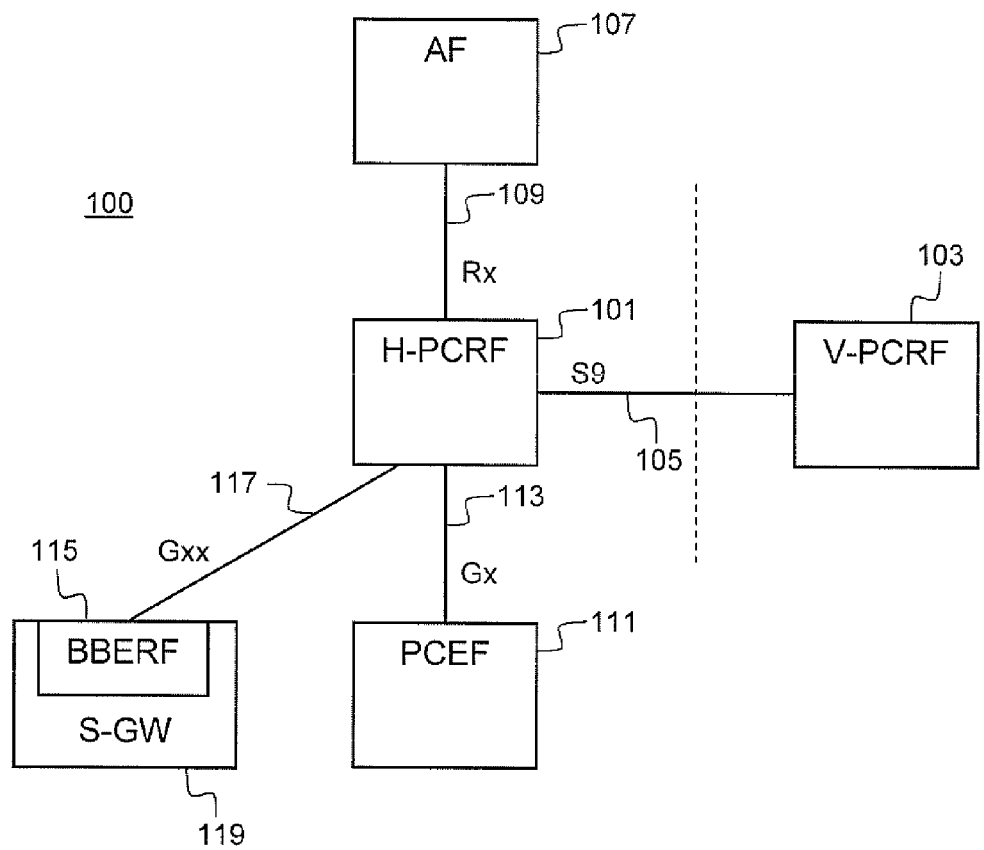
FIG. 1 illustrates a simplified block diagram of nodes of a 3GPP network.

FIG. 1 illustrates various elements of a 3rd Generation Partnership Project (3GPP) network 100. Policy and Charging Rule Function (PCRF) nodes 101, 103 can be a Home-PCRF 101 or a Visiting-PCRF 103 and communicate between themselves via the 3GPP-standard-defined S9 interface 105. PCRF 101 communicates with Application Function (AF) node 107 via the 3GPP-standard-defined Rx interface 109. PORE 101 communicates with a Policy and Charging Enforcement Function (PCEF) node 111 via 3GPP-standard-defined Gx interface 113. PCRF 101 communicates with a Bearer Binding and Event Reporting Function (BBERF) node 115 via 3GPP-standard-defined Gxx interface 117. The BBERF 115 functionality can be implemented as a part of a Serving Gateway (S-GW) 119. The S9, Rx, Gx and Gxx interfaces are defined by 3GPP Technical Specifications (TS) 29.215, 29.214, 29.212, and 29.212 standards respectively. In the context of Diameter messaging, the interfaces S9, Rx, Gx and Gxx are referred to as applications. Commands and AVPs can have definitions specific to a particular application even for the same 3GPP Version or Release.

Diameter protocol communications sessions are established by sending a session request message to the PCRF 101. For example, a PCEF would use a Gx Credit Control Request (CCR) message; a BBERF would use a Gxx CCR message; an AF node would use an Rx AA-Request (AAR) message. A PCRF peer would use an S9 CCR message. These session request messages include a Supported-Features Attribute Value Pair (AVP) to inform the receiving node about the required and optional features that the initiating node supports.

PCRF nodes typically need to interact with multiple nodes in the network, many of which could be from various vendors, thus it is advantageous if the PCRF node is flexible in terms of being able to interwork with different versions and different implementations of the 3GPP standards. The following description focuses on a PCRF node although embodiments of this invention can apply to other 3GPP nodes as well.

Embodiments of the present invention provide a Diameter versioning dictionary which is a Diameter Command Dictionary that supports multiple versions of the 3GPP protocol and hence multiple variations of Diameter commands.

FIG. 2 illustrates a conceptual representation of a data structure for a Diameter versioning dictionary 200. The dictionary contains entries for Diameter commands 201 and AVPs 203 with corresponding definitions 204, 205. Each command and AVP has a corresponding default definition 206 which defines the command or AVP for all versions of the 3GPP standard if no context exception applies. Thus, context-specific definitions are optional so that for example "AVP 2" 213 has only a single definition "Default Definition A2" that applies for all releases of the 3GPP standard and similarly, "Command 1" 214 has a single definition "Default Definition C1".

In addition, the Diameter versioning dictionary 200 can accommodate exceptions to the default definitions by defining one or more context-specific definitions 207 for each AVP or command. Each context-specific definition (e.g: "Definition A1-1" 211) is indexed by a context (e.g.: "Context 1" 209). A context identifies a specific condition to be met for the corresponding context-specific definition to apply. A context can comprise a specific 3GPP standard such as a major release (e.g.: Release 10) or a specific version of a major release such as a minor release (e.g: Release 10.4). A minor release could also be referenced by a release date (e.g: MARCH_2009). A context can also comprise a custom or proprietary implementation of a 3GPP standard from a specific vendor, identified by a custom label or identifier.

Note that a single context can act as a key for multiple definitions, thus for example with reference to FIG. 2, "Context 1" could represent "Release 8.4" and define "AVP 1" 215 as "Definition A1-1" 211 and define "AVP 3" 217 as "Definition A3-1" 219 and define "Command 2" 221 as "Definition C2-1" 223. "Context 2" could represent "Release 9.2" and define "AVP 3" 217 as "Definition A3-2" 225. In this way, multiple versions of a 3GPP standard can be accommodated by a single, flexible Diameter versioning dictionary.

The Diameter versioning dictionary interoperates with the Diameter protocol stack on the PCRF node. When the PCRF node needs to perform a "dictionary function" or "dictionary lookup" on or for a Diameter message, the PCRF first selects the 3GPP version required to communicate with the peer node, or required for the specific Diameter session as appropriate. The PCRF either knows the version that the peer node is running or the Diameter message indicates the version (in the Supported-Features AVP). The PCRF can check the version to find the proper definition of the command (e.g: AVPs, optional/mandatory). This selected 3GPP version is then used as a context during command look-up in the dictionary to access information about the given version of the command corresponding to the context or version. Definition attributes for commands can include whether it is optional or mandatory that the command itself is supported and can include AVPs and whether each AVP is optional or mandatory.

Examples of dictionary functions performed by a PCRF node that require correct version control of Diameter messages include: inquiries about commands (e.g.: syntax); validation of commands (e.g.: received from other nodes); formatting/building Diameter messages to send to other nodes; and translating Diameter messages between two versions when a PCRF is an intermediary between two nodes running at different versions (e.g.: a GW node running at 3GPP Release 7.1 and an application Function (AF) node running at 3GPP Release 8.1.)

Conceptually the Diameter versioning dictionary contains every command for all supported versions (releases) of the 3GPP protocol. Note that not all commands are supported in each version. For example, a newer version may introduce new commands and possibly not support older commands. Each command will have one or more entries for the AVPs that it supports for a given version and whether or not the command and/or any of the AVPs are mandatory or optional for that version.

The Diameter versioning dictionary can be implemented as an Extensible Markup Language (XML) file. The following listing segment illustrates examples of Diameter versioning dictionary entries for a RAT-Type (Radio Access Technology). The default definition for a RAT-Type AVP (attribute code=1032) defines the mFlag as "FORBIDDEN". A context-specific definition for the RAT-Type AVP defines the mFlag as "REQUIRED" in the cases where the "versionContext" is applicable, that is, where the "minorVersion"="MARCH_2009" and the following other conditions also apply: [application: vendorId/featureListId/featureList] matches any of: [Gx:3GPP/1/1] or [Rx:3GPP/1/1] or [Gxx:3GPP/1/0]:

```
<attribute code="1032"
    vendorName="3GPP"
    name="RAT-Type"
    format="ENUMERATED"
    mFlag="FORBIDDEN"
    pFlag="OPTIONAL"
    vFlag="REQUIRED"
    encrypt="true"
    register="true"
    proprietary="false"
<attribute code="1032"
    vendorName="3GPP"
    name="RAT-Type"
    format="ENUMERATED"
    mFlag="REQUIRED"
    pFlag="OPTIONAL"
    vFlag="REQUIRED"
    encrypt="true"
    register="true"
    proprietary="false"
    <versionContext>
        <tns:majorVersion application="Gx">
            <tns:supportedFeatures vendorId="3GPP" featureListId="1"
                featureList="1"/>
        </tns:majorVersion>
        <tns:majorVersion application="Rx">
            <tns:supportedFeatures vendorId="3GPP" featureListId="1"
                featureList="1"/>
        </tns:majorVersion>
        <tns:majorVersion application="Gxx">
            <tns:supportedFeatures vendorId="3GPP" featureListId="1"
                featureList="0"/>
        </tns:majorVersion>
        <tns:minorVersion> MARCH_2009 </tns:minorVersion>
    </versionContext>
</attribute>
```

The above example illustrates an example of a context-specific entry in a Diameter versioning dictionary for an AVP. Context-specific entries for Diameter commands can be similarly defined in a Diameter versioning dictionary using the embodiments of the present invention as would be apparent to persons skilled in the art.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A tangible non-transitory storage device readable by a machine, embodying a Diameter protocol command dictionary comprising: a first definition for a Diameter protocol command, wherein said Diameter protocol command is defined by a first default definition unless a first context applies in which case said command is defined by a context-specific definition, and the Diameter protocol command dictionary supports multiple versions of a standard, a second definition for a Diameter protocol attribute value pair (AVP), wherein said Diameter protocol or AVP is defined by a second default definition unless a second context applies in which case said AVP is defined by a second context-specific definition, wherein said Diameter protocol command dictionary interoperates with a Diameter protocol stack to perform functions for processing Diameter messages.

2. The tangible non-transitory storage device of claim 1, wherein said specific context comprises a specific version of a $3^{rd}$ Generation Partnership Project (3GPP) standard.

3. The tangible non-transitory storage device of claim 2, wherein said specific version comprises a proprietary version of said 3GPP standard.

4. A network node comprising a Diameter protocol command dictionary comprising: a first definition for a Diameter protocol command, wherein said Diameter protocol command is defined by a first default definition unless a first context applies in which case said command is defined by a context-specific definition, and the Diameter protocol command dictionary supports multiple versions of a standard, a second definition for a Diameter protocol attribute value pair (AVP), wherein said command or AVP is defined by a second default definition unless a second context applies in which case said AVP is defined by a second context-specific definition, wherein said Diameter protocol command dictionary interoperates with a Diameter protocol stack to perform functions for processing Diameter messages.

5. The network node of claim 4, wherein said specific context comprises a specific version of a $3^{rd}$ Generation Partnership Project (3GPP) standard.

6. The network node of claim 5, wherein said specific version comprises a proprietary version of said 3GPP standard.

7. The tangible non-transitory storage device of claim 2, wherein said context can be a major release or a minor release of said 3GPP standard.

8. The tangible non-transitory storage device of claim 7, wherein said minor release of said 3GPP standard may be identified by either a specific version number or release date.

9. The network node of claim 5, wherein said context can be a major release or a minor release of said 3GPP standard.

10. The network node of claim 9, wherein said minor release of said 3GPP standard may be identified by either a specific version number or release date.

11. A network node comprising a Diameter protocol command dictionary comprising: a definition for a Diameter protocol command, wherein the Diameter protocol command comprises a command default definition and a command first context specific definition; and a definition for a Diameter protocol attribute value pair (AVP), wherein the Diameter protocol AVP comprises an AVP default definition and an AVP first context specific definition and the Diameter protocol dictionary supports multiple versions of a standard, where said Diameter protocol command dictionary interoperates with a Diameter protocol to perform functions for processing Diameter messages.

12. The network node of claim 11, wherein the Diameter protocol command further comprises a command second context specific definition.

13. The network node of claim 11, wherein the Diameter protocol AVP further comprises AVP second context specific definition.

14. The network node of claim 11, wherein the command first context specific definition and the AVP first context specific definition may be identified by either a Diameter version number or release date.

15. The tangible non-transitory storage device of claim 1, wherein said Diameter protocol command dictionary is formatted in an Extensible Markup Language (XML) file.

16. The network node of claim 4, wherein said Diameter protocol command dictionary is formatted in an Extensible Markup Language (XML) file.

* * * * *